United States Patent
Johnsrud et al.

(10) Patent No.: US 9,825,931 B2
(45) Date of Patent: Nov. 21, 2017

(54) SYSTEM FOR TRACKING AND VALIDATION OF AN ENTITY IN A PROCESS DATA NETWORK

(71) Applicant: BANK OF AMERICA CORPORATION, Charlotte, NC (US)

(72) Inventors: Darrell Johnsrud, Camas, WA (US); Manu Jacob Kurian, Dallas, TX (US); Michael Wuehler, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 153 days.

(21) Appl. No.: 15/050,084

(22) Filed: Feb. 22, 2016

(65) Prior Publication Data

US 2017/0214675 A1    Jul. 27, 2017

Related U.S. Application Data

(60) Provisional application No. 62/287,298, filed on Jan. 26, 2016.

(51) Int. Cl.
G06F 7/04 (2006.01)
H04L 29/06 (2006.01)
H04L 9/32 (2006.01)

(52) U.S. Cl.
CPC ............ *H04L 63/08* (2013.01); *H04L 9/3242* (2013.01)

(58) Field of Classification Search
CPC ............................... H04L 63/08; H04L 9/3242
(Continued)

(56) References Cited

U.S. PATENT DOCUMENTS 5,671,283 A    9/1997  Michener et al.
5,835,599 A    11/1998 Buer
(Continued)

FOREIGN PATENT DOCUMENTS

WO    2014162296 A1    10/2014
WO    2015135018 A1    9/2015

OTHER PUBLICATIONS

Malahov, Yanislav Georgiev, "BitAlias 1, AKA Usernames for Bitcoin, A New, Simple Naming System for Bitcoin Addresses", retrieved from the Internet<URL: https://medium.com/bitalias-decentralized-naming-and-identity-service/bitalias-7b66bffed9d8#.ww4r3h4sn> on Mar. 12, 2017; Bringing Crypto to the People, Founder of www.aetemity.com, Jun. 6, 2015, 6 pages.

(Continued)

*Primary Examiner* — Teshome Hailu
(74) *Attorney, Agent, or Firm* — Michael A. Springs; Moore & Van Allen PLLC; Nicholas C. Russell (57) ABSTRACT

Embodiments of the invention are directed to a system, method, or computer program product for generating and using a block chain distributed network for tracking and validating a user identification morphing over time. The block chain database comprises a distributed ledger that is updated with real-time identification information including an initial identification of the user. Subsequent identifications are stored and changes or morphs in identification, such as signatures, physical attributes, or locations of the user are identified. User facts are correlated with the identifications to build a timeline for the user. Subsequently, the system generates authentication questions based off of the timeline generated. The authentication questions allow for authentication of a user into a third party system.

17 Claims, 5 Drawing Sheets

(58) Field of Classification Search
USPC .......................................................... 726/6
See application file for complete search history.

(56) References Cited

U.S. PATENT DOCUMENTS

| | | | |
|---|---|---|---|
| 6,324,286 | B1 | 11/2001 | Lai et al. |
| 6,850,252 | B1* | 2/2005 | Hoffberg ............ G06K 9/00369 |
| | | | 348/E7.061 |
| 6,973,187 | B2 | 12/2005 | Gligor et al. |
| 7,055,039 | B2 | 5/2006 | Chavanne et al. |
| 7,092,400 | B2 | 8/2006 | Malzahn |
| 7,184,549 | B2 | 2/2007 | Sorimachi et al. |
| 7,362,859 | B1 | 4/2008 | Robertson et al. |
| 7,392,384 | B2 | 6/2008 | Hopkins et al. |
| 7,428,306 | B2 | 9/2008 | Celikkan et al. |
| 7,502,933 | B2* | 3/2009 | Jakobsson ............ G06Q 20/341 |
| | | | 713/172 |
| 7,649,992 | B2 | 1/2010 | Raju et al. |
| 7,764,788 | B2 | 7/2010 | Tardo |
| 7,979,889 | B2* | 7/2011 | Gladstone .............. G06F 21/52 |
| | | | 726/1 |
| 8,078,874 | B2 | 12/2011 | You et al. |
| 8,107,621 | B2 | 1/2012 | Celikkan et al. |
| 8,155,311 | B2 | 4/2012 | Shin et al. |
| 8,259,934 | B2 | 9/2012 | Karroumi et al. |
| 8,358,781 | B2 | 1/2013 | Schneider |
| 8,396,209 | B2 | 3/2013 | Schneider |
| 8,397,841 | B1 | 3/2013 | Griffo et al. |
| 8,416,947 | B2 | 4/2013 | Schneider |
| 8,458,461 | B2 | 6/2013 | Tardo |
| 8,464,320 | B2* | 6/2013 | Archer ................... G06F 21/40 |
| | | | 709/224 |
| 8,516,266 | B2* | 8/2013 | Hoffberg ................ G05B 15/02 |
| | | | 713/151 |
| 8,590,055 | B2 | 11/2013 | Yoon et al. |
| 8,737,606 | B2 | 5/2014 | Taylor et al. |
| 8,942,374 | B2 | 1/2015 | Fujisaki |
| 8,983,063 | B1 | 3/2015 | Taylor et al. |
| 9,059,866 | B2 | 6/2015 | Bar-Sade et al. |
| 2004/0172535 | A1* | 9/2004 | Jakobsson ............ G06Q 20/341 |
| | | | 713/168 |
| 2005/0256802 | A1 | 11/2005 | Ammermann et al. |
| 2009/0281948 | A1 | 11/2009 | Carlson |
| 2012/0284175 | A1 | 11/2012 | Wilson et al. |
| 2013/0198061 | A1 | 8/2013 | Dheer et al. |
| 2014/0089243 | A1* | 3/2014 | Oppenheimer ......... G06F 21/50 |
| | | | 706/46 |
| 2015/0172053 | A1 | 6/2015 | Schwarz et al. |
| 2015/0206106 | A1 | 7/2015 | Yago |
| 2016/0050203 | A1* | 2/2016 | Hefetz ................... H04L 63/18 |
| | | | 726/7 |

OTHER PUBLICATIONS

International Search Report dated Mar. 12, 2017 and International Written Opinion dated Mar. 11, 2017 for International application No. PCT/IB 16/01655 dated Apr. 7, 2017.
Bradley Hope et al., "A Bitcoin Technology Gets Nasdaq Test"; May 10, 2015; retrieved from http://www.wsj.com/articles/a-bitcoin-technology-gets-nasdaq-test-1431296886.
Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.
Joseph C. Guagliardo et al., "Blockchain: Preparing for Disruption Like It's the '90s"; Mar. 14, 2016, retrieved from http://www.law360.com/articles/77120CVprint?section=ip.
Robert McMillian, "IBM Bets on Bitcoin Ledger"; Feb. 16, 2016, retrieved from http://www.wsj.com/articles/ibm-bets-on-bitcoin-ledger-1455598864.
Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.
International Search Report and Written Opinion for International Application No. PCT/US2016/061402 dated Dec. 27, 2016.
Tasca. "Digital currencies: Principles, trends, opportunities, and risks." In: Trends, Opportunities, and Risks. Sep. 7, 2015 (Sep. 7, 2015) Retrieved from <https://www.researchgate.net/profile/Paolo_Tasca/publication/290805276_Digital_Currencies_Principles_Trends_Opportunities_and_Risks/links/569bb91e08ae6169e5624552.pif> p. 5, 10, 12, 14.
Lerner. "MAVEPAY a new lightweight payment scheme for peer to peer currency networks." Apr. 17, 2012 (Apr. 17, 2012) Retrieved from <https://pdfs.semanticscholar.org/1185/a26f014678b959876519065c2624458d75b8.pdf>, entire document.

* cited by examiner

SYSTEM FOR TRACKING AND VALIDATION OF AN ENTITY IN A PROCESS DATA NETWORK

CROSS-REFERENCE OF RELATED APPLICATIONS

This application claims priority to U.S. Provisional Patent Application Ser. No. 62/287,298, filed Jan. 26, 2016, entitled "System for Tracking and Validation of an Entity in a Process Data Network," the entirety of which is incorporated herein by reference.

BACKGROUND

Entities and individuals alike utilize their identification for daily operations. Identities of entities and individuals tend to morph overtime, with name changes, signature changes, and maturation. As such, identifications may need to be updated for entities and individuals to be authorized for daily operations.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method, and computer program product for tracking and validating changing identities of user via a block chain database.

In some embodiments, the block chain database may identify and store in distributed ledger identifications of an entity or user over time. When signatures change or individuals grow older, the identification of that person morphs. These morphs are stored over time in the block chain database distributed ledger. In this way, a profile of a user may be generated and utilized for authorization question generation.

A user's identification morphs over time. The block chain system can record how the user's identification has morphed over time, thereby creating a block chain timeline of the user's life and facts about the user. A third party service may validate the user's identification or signature to the block chain database. Entities may be tiered to have access to different levels of information about a user's identity. The system may also generate factually-based challenge questions to authenticate a user's identity.

Embodiments of the invention relate to systems, methods, and computer program products for tracking and validating instances of a user, the invention comprising: receiving an initial identification for the user at one or more nodes of the block chain distributed network; updating a distributed ledger with the initial identification via transmission of data from the one or more nodes to the distributed ledger associated with the block chain distributed network; receiving one or more subsequent identifications for the user at the one or more nodes of the block chain distributed network, wherein the received one or more identifications identify morphs in the user identification over a time period; confirming, via communication with third party systems, the received one or more subsequent identifications are associated with the user; linking the one or more subsequent identifications for the user to the initial identification to generate a timeline illustrating morphing of user identification over time; correlating user facts received from the one or more nodes of the block chain distributed network and third party systems to the timeline; generating one or more authentication questions based on the user facts and timeline; and presenting the generated one or more authentication questions to the user via a user device for user access into third party secure locations.

In some embodiments, the invention further comprising receiving a positive response to the presented one or more authentication questions from the user, wherein receiving the positive response to the presented one or more authentication questions further comprises allowing access into the third party secure location without additional third party authentication requirements.

In some embodiments, generating the one or more authentication questions based on the user facts and timeline further comprises generating a tier level authentication question based on authentication strength requirements for accessing the third party secure location.

In some embodiments, the timeline illustrates changes in user identification including changes in signatures, physical attributes of the user, and geographic relocations of the user.

In some embodiments, the initial identification and the one or more subsequent identifications comprises a government issued identification.

In some embodiments, the invention further comprising allowing access to the timeline for one or more entities based on a provided assessment from the one or more entities.

In some embodiments, the one or more nodes of the block chain distributed network is integrated into a third party system and coded to identify and transmit to the distributed ledger the initial identification and the subsequent identifications for the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to an individual that may have one or more identifications associated with the individual. Furthermore, as used herein the term "user device" or "mobile device" may refer to mobile phones, personal computing devices, tablet computers, wearable devices, and/or any portable electronic device capable of receiving and/or storing data therein.

An "account" is the relationship that a user has with an entity or another entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity. "Resources" include accounts of the user and/or other property owned by the user. The resources may be associated with accounts or may be property that is not associated with a specific account. Examples of resources associated with accounts may be accounts that have cash or cash equivalents, or accounts that are funded with or contain property, such as safety despots box account that jewelry, a trust account that is funded with property, or the like. Examples of resources that may not be associated with accounts may be antiques in a user's home, jewelry in a user's home, or the like. "Funds" or "Available Balance" are a balance in an account that can be invested or withdrawn. For example, the funds may refer to a bank ledger balance minus the amount of any monetary checks in the process of collection. Funds may also be referred to as an available balance, a collected balance, good funds, and usable funds.

A "transaction" or "resource distribution" refers to any communication between a user and the financial institution or other entity monitoring the user's activities. Alternatively, in some embodiments, the term "transaction" may be used when describing the block chain database as a transaction type of record. The transaction type records consists of the actual data stored in the block chain. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Embodiments of the present invention address the above needs and/or achieve other advantages by providing apparatuses (e.g., a system, computer program product and/or other devices) and methods for operatively connecting with a block chain distributed network and using the block chain distributed network for generating an identification for a user.

In some embodiments, the block chain database may identify and store in distributed ledger an identification of a user over time. In some embodiments, the system may validate the received identification. In other embodiments, a third party system may validate the received identification. Each time an identification is used or updated for the user over time the block chain database adds the new identification to the distributed ledger. The new or updated identification may illustrate changes in address, personal characteristics such as height, weight, hair color, or the like, changes in physical appearance, and/or changes in signatures. In this way, the block chain database may store the identifications through time to illustrate the morphing of the identification across a duration of time. The timeline may then be used to generate factually-based challenge questions for user authentication.

Embodiments of the invention are directed to a system, method, or computer program product for a distributive network system with specialized data feeds associated with the distributive network and specific triggering events associated with the data feeds for user identification. Thus, the system may communicate with, store, and execute code for real-time identification via a block chain database architecture.

Figure 1:
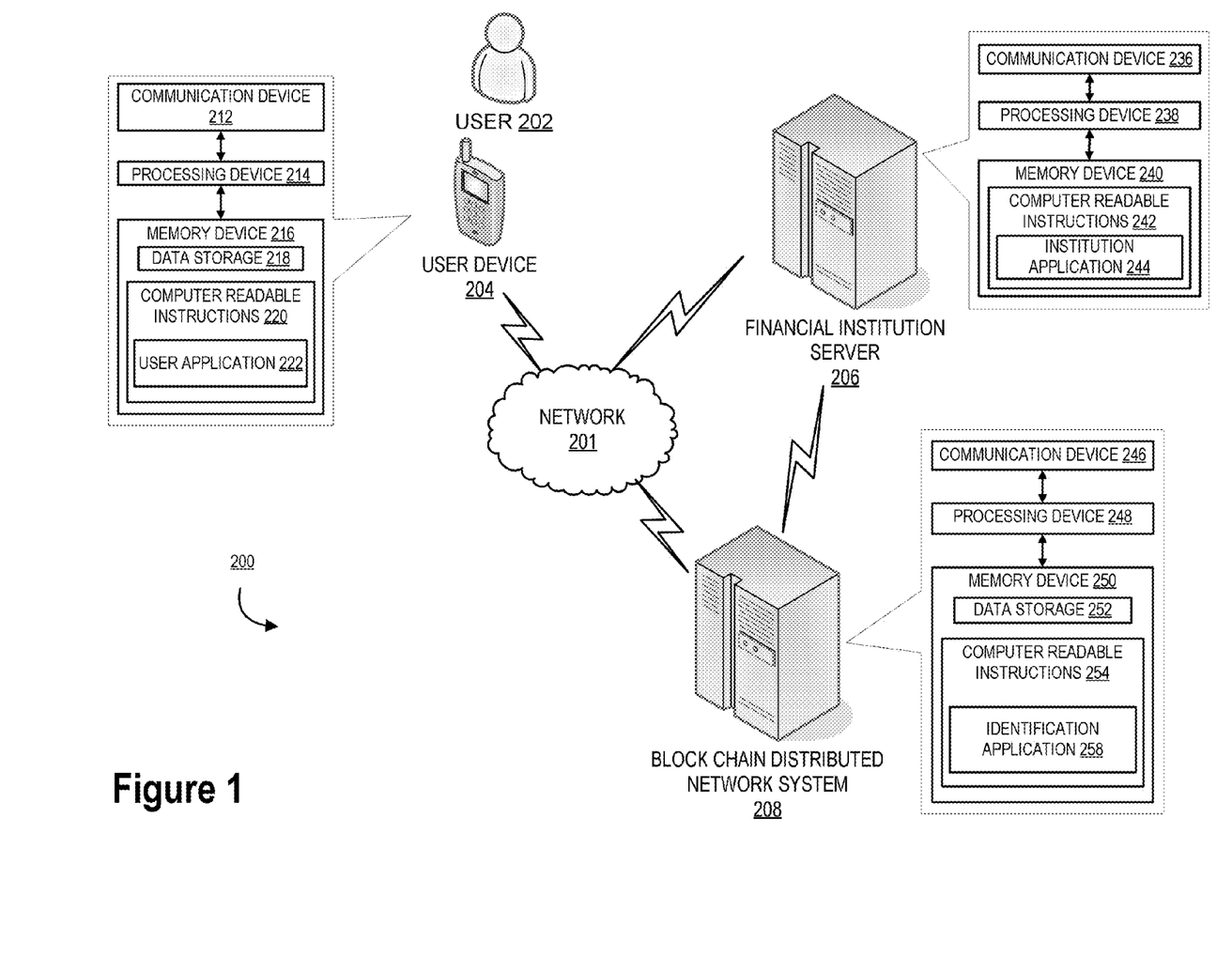
FIG. 1 provides a block chain identification system environment, in accordance with one embodiment of the present invention.

FIG. 1 illustrates block chain identification system environment 200, in accordance with one embodiment of the present invention. FIG. 1 provides the system environment 200 for which the distributive network system with specialized data feeds associated with the block chain instrument conversion.

FIG. 1 provides a unique system that includes specialized servers and system communicably linked across a distributive network of nodes required to perform the functions of user identification timeline mapping and factually-based challenge question generation.

As illustrated in FIG. 1, the block chain distributed network system 208 is operatively coupled, via a network 201 to the user device 204, and to the financial institution server 206. In this way, the block chain distributed network system 208 can send information to and receive information from the user device 204 and the financial institution server 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has one or more identifications. In some embodiments, the user 202 has a user device, such as a mobile phone, tablet, computer, or the like. FIG. 1 also illustrates a user device 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the financial institution server 206 and the block chain distributed network system 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to complete a transaction.

As further illustrated in FIG. 1, the block chain distributed network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the financial institution server 206 and the user device 204. As such, the communication device 246 generally comprises a modem, server, or other device for communicating with other devices on the network 201.

As further illustrated in FIG. 1, the block chain distributed network system 208 comprises computer-readable instructions 254 stored in the memory device 250, which in one embodiment includes the computer-readable instructions 254 of an identification application 258. In some embodiments, the memory device 250 includes data storage 252 for storing data related to the system environment, but not limited to data created and/or used by the identification application 258.

Embodiments of the block chain distributed network system 208 may include multiple systems, servers, computers or the like maintained by one or many entities. FIG. 1 merely illustrates one of those systems that, typically, interacts with many other similar systems to form the block chain. In one embodiment of the invention, the block chain distributed network system 208 is operated by a second entity that is a different or separate entity from the financial institution server 206. In some embodiments, the financial institution server 206 may be part of the block chain. Similarly, in some embodiments, the block chain distributed network system 208 is part of the financial institution server 206. In other embodiments, the financial institution server 206 is distinct from the block chain distributed network system 208.

In one embodiment of the block chain distributed network system 208 the memory device 250 stores, but is not limited to, an identification application 258 and a distributed ledger. In some embodiments, the distributed ledger stores data including, but not limited to, smart identification logic and rules, user identifications, user legal identifications, associated logic and rules, and the like. In one embodiment of the invention, both the identification application 258 and the distributed ledger may associate with applications having computer-executable program code that instructs the processing device 248 to operate the network communication device 246 to perform certain communication functions involving described herein. In one embodiment, the computer-executable program code of an application associated with the distributed ledger and identification application 258 may also instruct the processing device 248 to perform certain logic, data processing, and data storing functions of the application.

The processing device 248 is configured to use the communication device 246 to gather data, such as data corresponding to transactions, blocks or other updates to the distributed ledger from various data sources such as other block chain network system. The processing device 248 stores the data that it receives in its copy of the distributed ledger stored in the memory device 250.

In the embodiment illustrated in FIG. 1 and described throughout much of this specification, the identification application 258 may integrate nodes of the generated block chain database into various systems, determine initial identifications of the user, link subsequent identifications illustrating morphs in user identification, generate a user timeline including user facts, generate authentication questions, and allow tiered level access to block chain database.

In some embodiments, the identification application 258 may integrate nodes of the generated block chain database into various systems. In some embodiments, the identification application 258 may generate a block chain database specifically for identification authentication using questions for transaction completion that connects with user systems, merchant systems, financial institution systems, internet systems management systems, and/or management entities to generate a block chain database with information about user identifications used in the past and currently being used. In this way, the user identities may be tracked across time to generate a holistic view of the user and morphs of the user's identification. In other embodiments, the identification application 258 may piggy back off of an existing block chain database and code the database for identification authentication for transaction completion.

The block chain database generated is a decentralized block chain configuration that ensures accurate mapping of real-time user identifications that the user may be using and/or used in the past. Accordingly, a block chain configuration may be used to maintain an accurate ledger of identifications over time and to provide validation of identifications using generated authentication questions for authorizing transactions. The generated block chain database maintains a list of data records, such as real-time and on-going list of user identifications associated with a user. A block chain typically includes several nodes, which may be one or more systems, machines, computers, databases, data stores or the like operably connected with one another.

Furthermore, the identification application 258 may integrate and provide nodes of the block chain distributed database into various systems. In this way, the identification application 258 may code nodes for integration into one or more user systems, merchant systems, financial institution systems, internet systems management systems, and/or management entities. In some embodiments, the identification application 258 may generate nodes that are independent of the systems. As such, the nodes may be separate devices and be coded for recognizing user identifications.

In some embodiments, the identification application 258 may determine initial identifications of the users as end-points. In some embodiments, the initial identification may be the end-point identification such as an original legal name, a given birth name, social security number, tax identification number, original identification card, first driver's license, first passport, or the like. The identification application 258 may determine the initial identification by identifying one or more user identifications from the one or more nodes of the block chain database. In this way, users, identification issuers, financial institutions, merchants, entities, or the like may provide identification information to the identification application 258 in real-time, such that a real-time identification information of a user 202 is provided in an ongoing record of a user 202 into a distributed ledger in the block chain database. The identification application 258 may determine the initial identification based on the type of identification received. In some embodiments, several identifications may be received by the identification application 258 prior to receiving the initial identification. In other embodiments, the identification application 258 may receive the initial identification first. The identification application 258 may determine the initial identification by identifying an age of the identification, a type of identification, or the like.

Once the initial identification of the user is determined, the identification application 258 may store the determined initial identification in the block chain database distributed ledger. The storage may indicate that the identification is the initial identification in the distributed ledger and allow for ongoing records to be built off of the initial identification.

In some embodiments, the identification application 258 may link subsequent identifications that illustrate morphs in the user identification. As such, the identification application 258 via nodes may identify subsequent identifications associated with the user 202. The subsequent identifications may be received from various nodes associated with the identification application 258. The identifications may be time and date stamped upon receiving of the identification at the various nodes. These subsequent identifications may be linked the initial identification in the distributed ledger for the ongoing record of identifications of a user 202.

In some embodiments, the identification application 258 generate a user timeline including user facts. The identification application 258 generates a user timeline illustrating the changes or morphs of a user's identification over time. In this way, the identification application 258 may link the subsequent identifications identified to the initial identification in the distributed ledger for the ongoing timeline of user identification. In this way, a chain of changes in identifications from an original identification to a current one, whether the changes be physical or the like are linked together based on time stamp in the distributed ledger.

The timeline is generated starting with the initial identification and being built in blocks of changed or morphed user identifications over time. These identifications may be stored together in correlation with the initial identification and illustrate a holistic view of a user identification and the changes of that identification, whether physical, location, signature, or the like, over a time period of the user's lifetime. Furthermore, the timeline may access third party servers in order to fill the timeline with facts about the user's life in correlation with the identification. The third party servers may include entity servers, financial institution servers, or the like. The user life facts may include events in the user's life identified by the identification changes, third party servers, or the like. These events may include geographic moves, location changes, vehicle purchases, house purchases, having a child, child life events, graduating school, or the like. As such, the distributed ledger may have a timeline of morphed identification of the user as well as facts that are correlated with the identifications for a view of the user.

Subsequently, the identification application 258 may store the timeline of the user identifications and the correlated user life facts are stored in the distributed ledger of the block chain database. Thus, the timeline is stored for access by anyone on the distributed network.

In some embodiments, the identification application 258 may generate authentication questions. The identification application 258 may generating factually-based challenge questions for authentication of a user identity based on the user timeline. In this way, the identification application 258 may determine facts about the user's life based on the timeline of user identification. As such, the system may be able to determine user location moves, user age maturation, use marriage, and/or the like. Furthermore, the identification application 258 may link to financial institutions or the like to determine life events such as college graduations, marriage, having a child, or the like. These life events that are determined by the system may be utilized to generate factually-based, based on the life events determined, challenge questions to authenticate the user for a transaction.

Finally, the identification application 258 allows, based on a determined tier level, access to information about the user identifications. In this way, entities may have access to the user identification information to be used for authorization of the user. The amount of access may be determined based on a tier level approach. The higher the level, the more access the entity may have.

The tiers may be based on an allocation amount for the service, an entity loyalty, an entity providing information to the block chain database, or the like. As such, the entity may have access to the user identification timeline for user authentication for access to one or more entity restricted zones. The entity gaining access to the block chain database may be a financial institution, merchant, or the like. Higher level tiers may have access to all users and all user identification information, while lower level tiers may have access to only entity customer information and/or limited identification information.

As illustrated in FIG. 1, the financial institution server 206 is connected to the block chain distributed network system 208 and is associated with a financial institution network. In this way, while only one financial institution server 206 is illustrated in FIG. 1, it is understood that multiple network systems may make up the system environment 200. The financial institution server 206 generally comprises a communication device 236, a processing device 238, and a memory device 240. The financial institution server 206 comprises computer-readable instructions 242 stored in the memory device 240, which in one embodiment includes the computer-readable instructions 242 of an institution application 244. The financial institution server 206 may communicate with the block chain distributed network system 208 to provide real-time resource availability for a user account. While the block chain distributed network system 208 may communicate with the financial institution server 206 via a secure connection generated for secure encrypted communications between the two systems for communicating a resource commitment for an non-secure instrument such that resources are allocated for the non-secure instrument and are not available for subsequent use.

It is understood that the servers, systems, and devices described herein illustrate one embodiment of the invention. It is further understood that one or more of the servers, systems, and devices can be combined in other embodiments and still function in the same or similar way as the embodiments described herein.

Figure 2A:
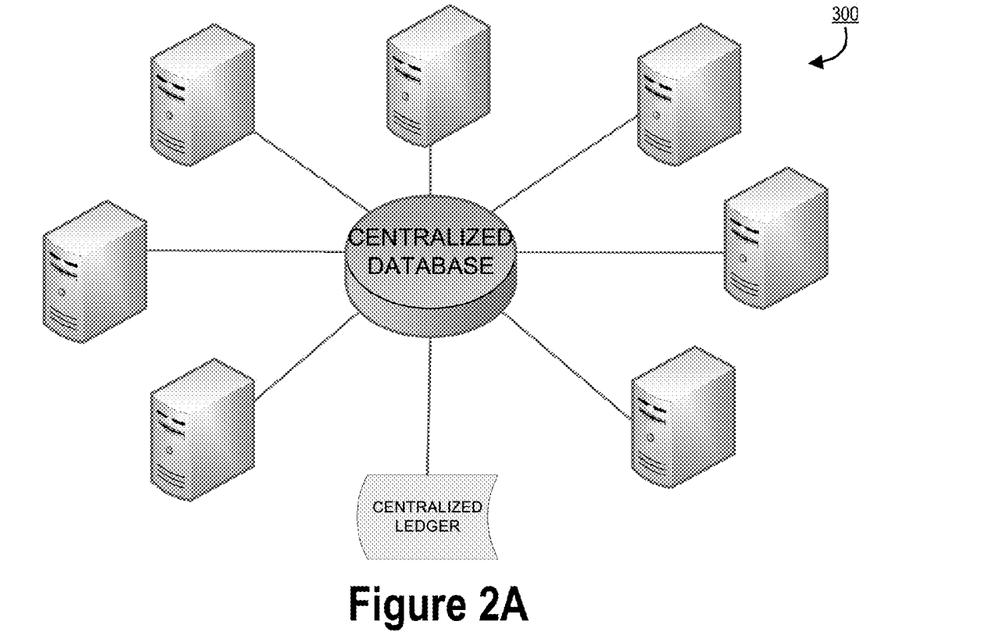
FIG. 2A provides centralized database architecture environment, in accordance with one embodiment of the present invention.

FIG. 2A illustrates a centralized database architecture environment 300, in accordance with one embodiment of the present invention. The centralized database architecture comprises multiple nodes from one or more sources and converge into a centralized database. The system, in this embodiment, may generate a single centralized ledger for data received from the various nodes.

Figure 2B:
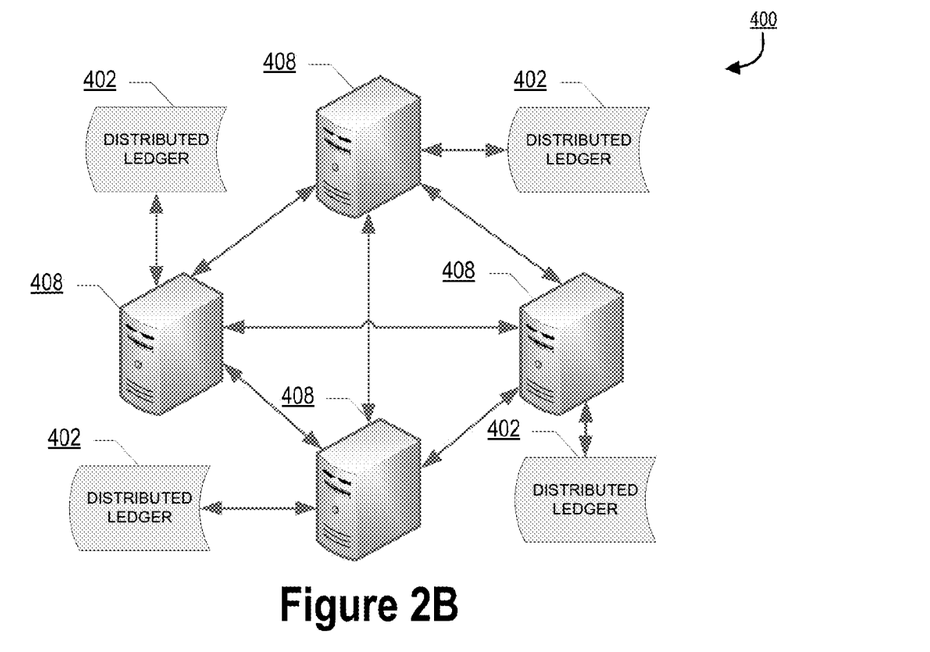
FIG. 2B provides a block chain system environment architecture, in accordance with one embodiment of the present invention.

FIG. 2B provides a block chain system environment architecture 400, in accordance with one embodiment of the present invention. Rather than utilizing a centralized database of data for instrument conversion, as discussed above in FIG. 2A, various embodiments of the invention may use a decentralized block chain configuration or architecture as shown in FIG. 2B in order to facilitate the converting of an instrument from a non-secured format to a secured format. Such a decentralized block chain configuration ensures accurate mapping of user identifications over time. Accordingly, a block chain configuration may be used to maintain an accurate ledger of changes to a user's identification over time. This way tracking and maintaining user changes in identification for verification of the user's identity.

A block chain or blockchain is a distributed database that maintains a list of data records, such as real-time identifications associated with one or more users, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies. The data records recorded in the block chain are enforced cryptoraphically and stored on the nodes of the block chain.

A block chain provides numerous advantages over traditional databases. A large number of nodes of a block chain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the block chain that creates a transaction can determine within a level of certainty whether the transaction can take place and become final by confirming that no conflicting transactions (i.e., the same currency unit has not already been spent) confirmed by the block chain elsewhere.

The block chain system typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person), and blocks are created by users known as "miners" who use specialized software/equipment to create blocks. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases that meets other criteria. In some block chain systems, miners are incentivized to create blocks by a rewards structure that offers a pre-defined per-block reward and/or fees offered within the transactions validated themselves. Thus, when a miner successfully validates a transaction on the block chain, the miner may receive rewards or the like as an incentive to continue creating new blocks. In some embodiments, transactions type records comprise various identifications for users.

As mentioned above and referring to FIG. 2B, a block chain system 400 is typically decentralized—meaning that a distributed ledger 402 (i.e., a decentralized ledger) is maintained on multiple nodes 408 of the block chain 400. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains.

In some embodiments the block chain distributed network nodes 408 while part of the block chain disturbed network system 208 may be integrated into or associated with a financial institution system, a merchant system, a user system, or the like. In this way, when the block chain distributed network nodes 408 is integrated into a channel, the block chain distributed network nodes 408 may identify identifications used by the user and provide the real-time identification updates to the ledger. Furthermore, the block chain distributed network nodes 408 may be coded for identification of user identification updates. Thus, once integrated into the channel the block chain distributed network nodes 408 may identify changes or updates in identifications and provide the same to the distributed ledger for updating.

Various other specific-purpose implementations of block chains have been developed. These include distributed domain name management, decentralized crowd-funding, synchronous/asynchronous communication, decentralized real-time ride sharing and even a general purpose deployment of decentralized applications. The block chain 400 may perform one or more of the steps or functions performed by the block chain distributed network system as discussed above with reference to FIG. 1.

In various embodiments of the invention, a block chain implementation is used to identify various identification of a user for transaction completion authorization. For real-time identification and authentication purposes, multiple active directories may be created. In such cases, a need exists to ensure mappings are not overloaded or redirected and in order to maintain a complete audit trail. The block chain configuration is used to index accounts and resources via mappings in all directories and maintain a full and visible audit trail. Mining is used, in some embodiments, to ensure that changes to specific mappings and identifications are confirmed and/or have reached a predetermined level of consensus. This also ensures unauthorized users are not manipulating the directories.

Identifications of users are mapped to the appropriate user for subsequent transaction completion via any user identification. This information must be universally available to everyone on the network, and the block chain configuration enables such information distribution. In some embodiments of the invention, such a mapping, while integral to clearing (or validating) the transaction, the mapping of the identifications to a user is maintained as private information. For example, the mapping may be maintained at a server local to the financial institution. Thus, once a requested transaction has been placed on the public block chain, the block chain network recognizes that the identification associated with the transaction is mapped to a particular user. That financial institution's server or system connected to the block chain receives the information about the user and user authentication and can validate that the transaction may be validated by looking up the appropriate mapping of the user identification. As noted, this information is not placed on the public block chain, but rather is held privately, such as on a private block chain or a "side-chain".

One advantage of using a block chain configuration for real-time user identification is the authorization security and an opportunity for scaling. Thousands of financial institutions, merchants, and/or users may participate in a block chain real-time user identification and, therefore, the time to validation of an identification to a user may be shortened.

For example, a proposed transaction that is placed on the block chain may be validated by one or a predetermined number of nodes of the block chain in order for the transaction to proceed. The nodes may work as miners or "validators" in order to confirm the identification of a user for authorization of the transaction and is mapped to a particular, valid financial institution. This determination may be based on the fact that the financial institution that originally mapped the instrument to itself (the "originating FI") has placed it on the block chain and in some cases, has included additional information such as a key that validates the instrument.

The block chain may be configured with a set of rules to dictate the validation of previously used identifications and validate the user for an authentication. In some embodiments, the rules dictate that the originating FI must approve all transactions for instruments mapped to that FI. In some embodiments, the rules dictate that some or all transactions may be approved by one or more validator nodes without further input from the originating FI other than the validation of the mapped instrument and resources. In some such cases, the rules dictate that the mapped instrument, when placed on the block chain also includes additional information that is useful in determining whether an identification presented by the user is authorized for completion of a transaction.

Figure 3:
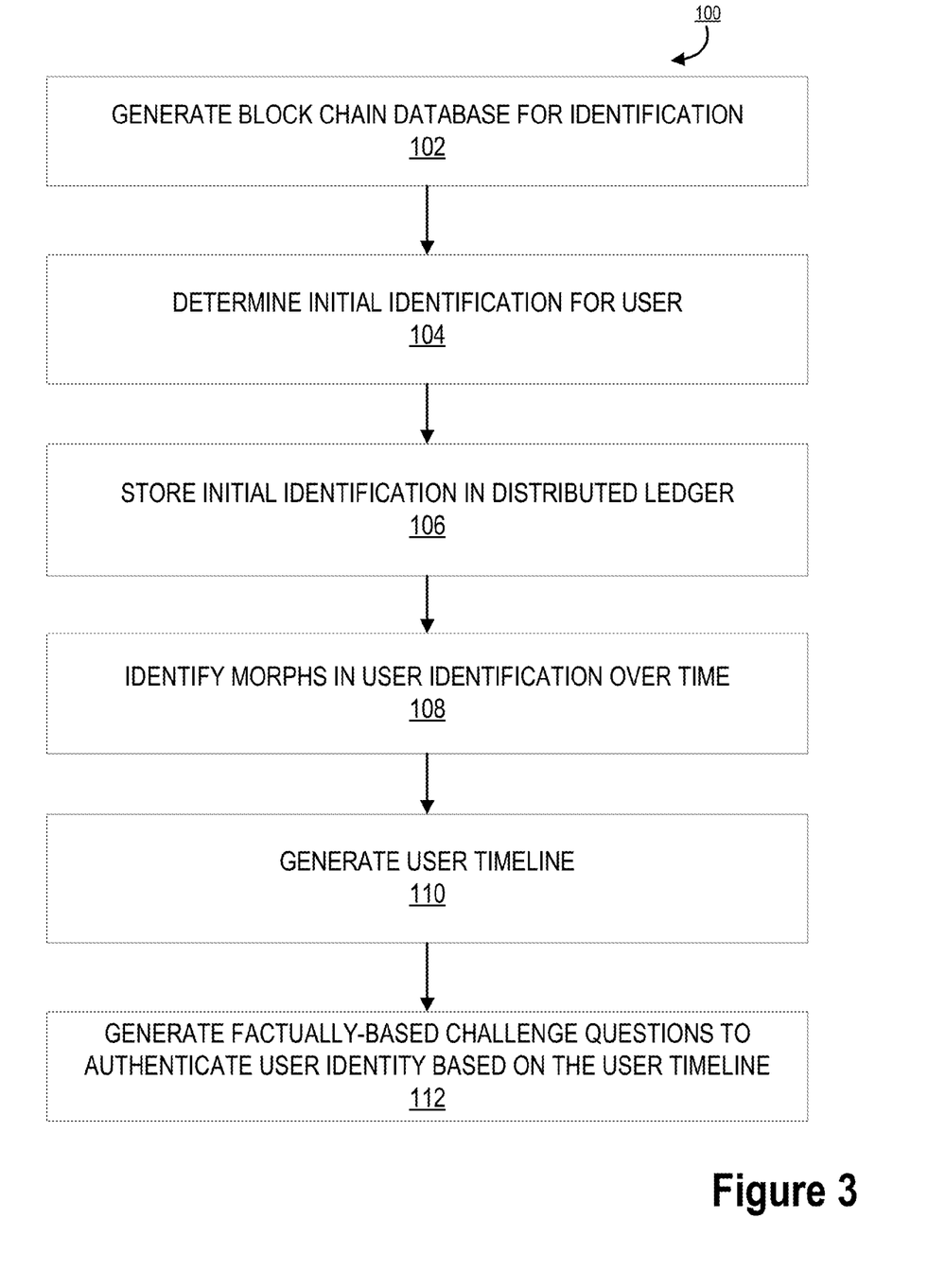
FIG. 3 provides a high level process flow illustrating a block chain user identification timeline generation process, in accordance with one embodiment of the present invention.

FIG. 3 provides a high level process flow illustrating a block chain user identification timeline generation process 100, in accordance with one embodiment of the present invention. As illustrated in block 102, the process 100 is initiated by generating a block chain database for identification. In this way, the system generates a block chain database that connects with user systems, merchant systems, financial institution systems, internet systems management systems, and/or management entities to generate a block chain database with information about user identifications used in the past and currently being used. In this way, the user identities may change over time. Specifically, the user signature, physical attributes, or the like may change overtime.

The block chain database generated is a decentralized block chain configuration that ensures accurate mapping of real-time user identifications that the user may be using and/or used in the past. Accordingly, a block chain configuration may be used to maintain an accurate ledger of identities and to provide validation of identifications and/or to generate factually-based challenge questions for authorizing transactions. The generated block chain database maintains a list of data records, such as real-time and on-going timeline of user identities. Furthermore, the block chain database may also maintain rules associated with the generation of factually based challenge questions and tier entity access levels to allow access to information about a user's identity. The security of which is enhanced by the distributed nature of the block chain. A block chain typically includes several nodes, which may be one or more systems, machines, computers, databases, data stores or the like operably connected with one another.

Next, as illustrated in block 104 the process 100 continues by determining the initial identification of the user. In some embodiments, the initial identification may be a first government issued identification, drivers license, birth certificate, social security identification, or the like. Determining the initial identification may be performed by identifying one or more user identifications from the one or more nodes of the block chain database. In this way, users, identification issuers, financial institutions, merchants, entities, or the like may provide identification information to the block chain database in real-time, such that a real-time identification information of a user is provided in an ongoing record of a user into a distributed ledger in the block chain database. The system may determine the initial identification based on the type of identification received. The system may determine the initial identification by identifying an age of the identification, a type of identification, or the like.

As illustrated in block 106, once the initial identification of the user is determined, the process 100 continues by storing the initial identification in the block chain database distributed ledger. The storage may indicate that the identification is the initial identification in the distributed ledger and allow for ongoing records to be built off of the initial identification to build a user identification timeline.

As illustrated in block 108, the process 100 continues by identifying morphs in the user identification over time. In this way, the identification changes or morphs may be received from various nodes associated with the block chain database. The identifications may be time and date stamped upon receiving of the identification at the various nodes associated with the block chain database. In some embodiments, the morphs may be identified changes in user signatures. In some embodiments, the morphs may be physical changes of the user, these changes may include height, weight, hair color, sex, or the like associated with the user. Furthermore, the morphs may include address changes, name changes, or the like. Furthermore, the changes may include legal name changes, aliases, nick names, user names, or the like. Furthermore, the morphs may also identify varying signatures based on where and what is being signed by the user. For example, if a user is signing an electronic signature pad, the system may recognize the signature morph of the user's signature based on it being a signature on an electronic signature pad which may be a different signature or different appearance in signature compared to a signed document.

Next, as illustrated in block 110, the process 100 continues by generating a user timeline illustrating the changes or morphs of a user's identification over time. In this way, the system may link the subsequent identifications identified from block 108 to the initial identification in the distributed ledger for the ongoing timeline of user identification. In this way, a chain of changes in identifications from an original identification to a current one, whether the changes be physical or the like are linked together based on time stamp in the distributed ledger. Furthermore, the system may also track the last time the user used the identification for transaction authorization.

Finally, as illustrated in block 112, the process 100 continues by generating factually-based challenge questions for authentication of a user identity based on the user timeline. In this way, the system may determine facts about the user's life based on the timeline of user identification. As such, the system may be able to determine user location moves, user age maturation, use marriage, and/or the like. Furthermore, the system may link to financial institutions or the like to determine life events such as college graduations, marriage, having a child, or the like. These life events that are determined by the system may be utilized to generate factually-based, based on the life events determined, challenge questions to authenticate the user for a transaction.

Figure 4:
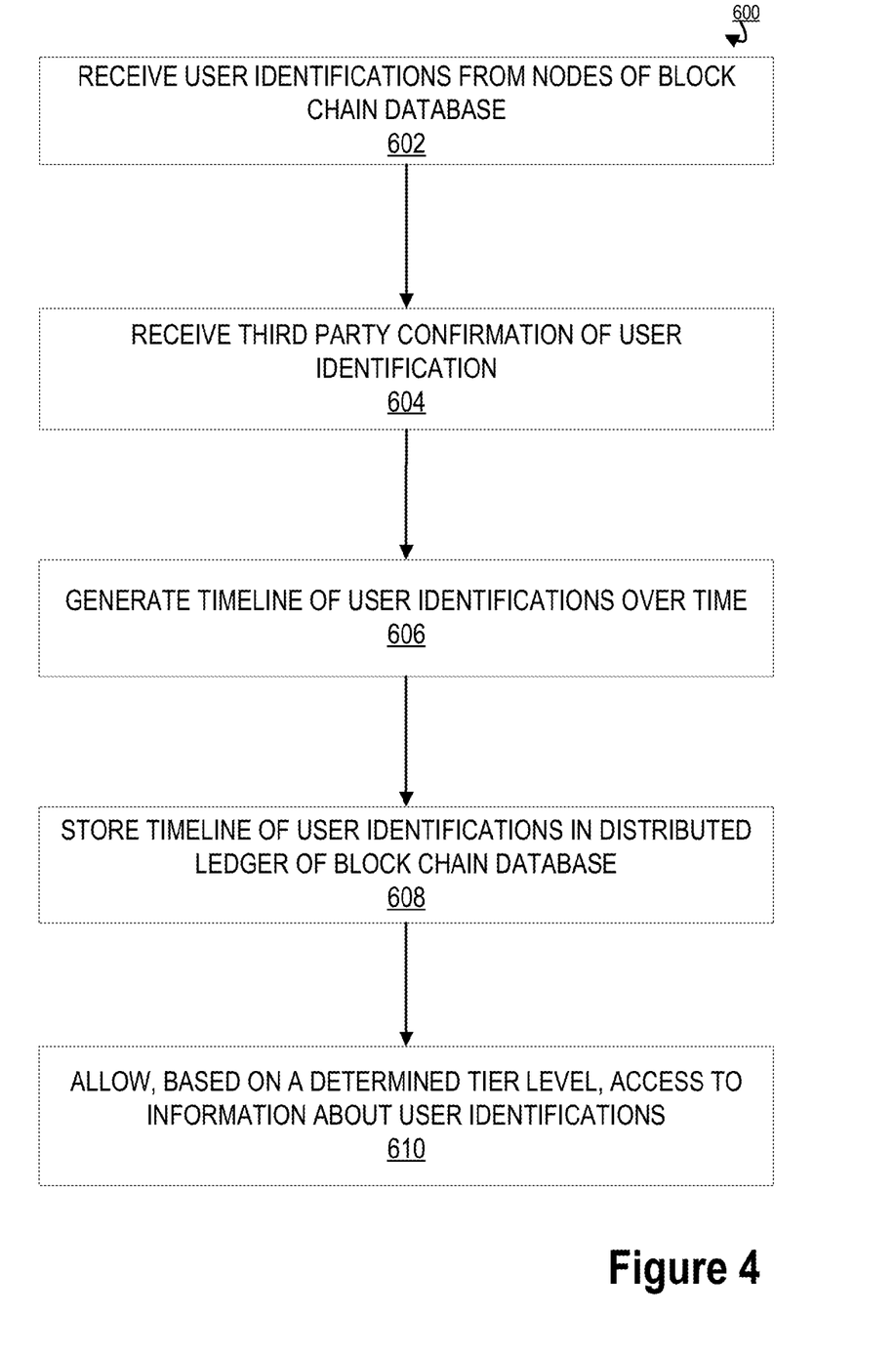
FIG. 4 provides a process map illustrating a block chain user identification timeline generation process, in accordance with one embodiment of the present invention.

FIG. 4 illustrates a process map for a block chain user identification timeline generation process 600, in accordance with one embodiment of the present invention. As illustrated in block 602, the process 600 is initiated by receiving user identifications from the block chain database. These identifications form the timeline of the user and are stored in the distributed ledger of the block chain database. In some embodiments, the invention may generate the block chain database for the identification tracking and validation. In other embodiments, the invention may code a current block chain database for the identification tracking and validation. In some embodiments, nodes may be independent of systems such as merchants, financial institutions, users, or the like. In other embodiments, the nodes may be coded for recognizing user identifications and be integrated into the various systems.

Next, as illustrated in block 604, the process 600 continues by receiving third party confirmation of the user identification. In this way, the system may receive, from a third party, a confirmation that the user identification received in block 602 is an authentic identification. The third party may be a financial institution or the like that has a level of confidence that the identification received is that of the user.

As illustrated in block 606, the notifications received at the nodes of the block chain database may be compiled to generate a timeline of user identifications over a period of time. The timeline illustrates an initial identification of the user and blocks with each morphed identification for the user stored in association with the initial identification. As such, the system may store the initial identification as well as changes to the user's identification such as signature changes, physical changes, and/or the like. This creates a timeline of user identification in the distributed ledger of the block chain database. This timeline creates a holistic view of the user over time, illustrating the changes in a user's identification.

The timeline is generated starting with the initial identification and being built in blocks of changed or morphed user identifications over time. These identifications may be stored together in correlation with the initial identification and illustrate a holistic view of a user identification and the changes of that identification, whether physical, location, signature, or the like, over a time period of the user's lifetime. Furthermore, the timeline may access third party servers in order to fill the timeline with facts about the user's life in correlation with the identification. The third party servers may include entity servers, financial institution servers, or the like. The user life facts may include events in the user's life identified by the identification changes, third party servers, or the like. These events may include geographic moves, location changes, vehicle purchases, house purchases, having a child, child life events, graduating school, or the like. As such, the distributed ledger may have a timeline of morphed identification of the user as well as facts that are correlated with the identifications for a view of the user.

As illustrated in block 608, the timeline of the user identifications and the correlated user life facts are stored in the distributed ledger of the block chain database. Thus, the timeline is stored for access by anyone on the distributed network. Finally, as illustrated in block 610 the process 600 is terminated by allowing, based on a determined tier level, access to information about the user identifications. In this way, entities may have access to the user identification information to be used for authorization of the user. The amount of access may be determined based on a tier level approach. The higher the level, the more access the entity may have.

The tiers may be based on an allocation amount for the service, an entity loyalty, an entity providing information to the block chain database, or the like. As such, the entity may have access to the user identification timeline for user authentication for access to one or more entity restricted zones. The entity gaining access to the block chain database may be a financial institution, merchant, or the like. Higher level tiers may have access to all users and all user identification information, while lower level tiers may have access to only entity customer information and/or limited identification information.

Figure 5:
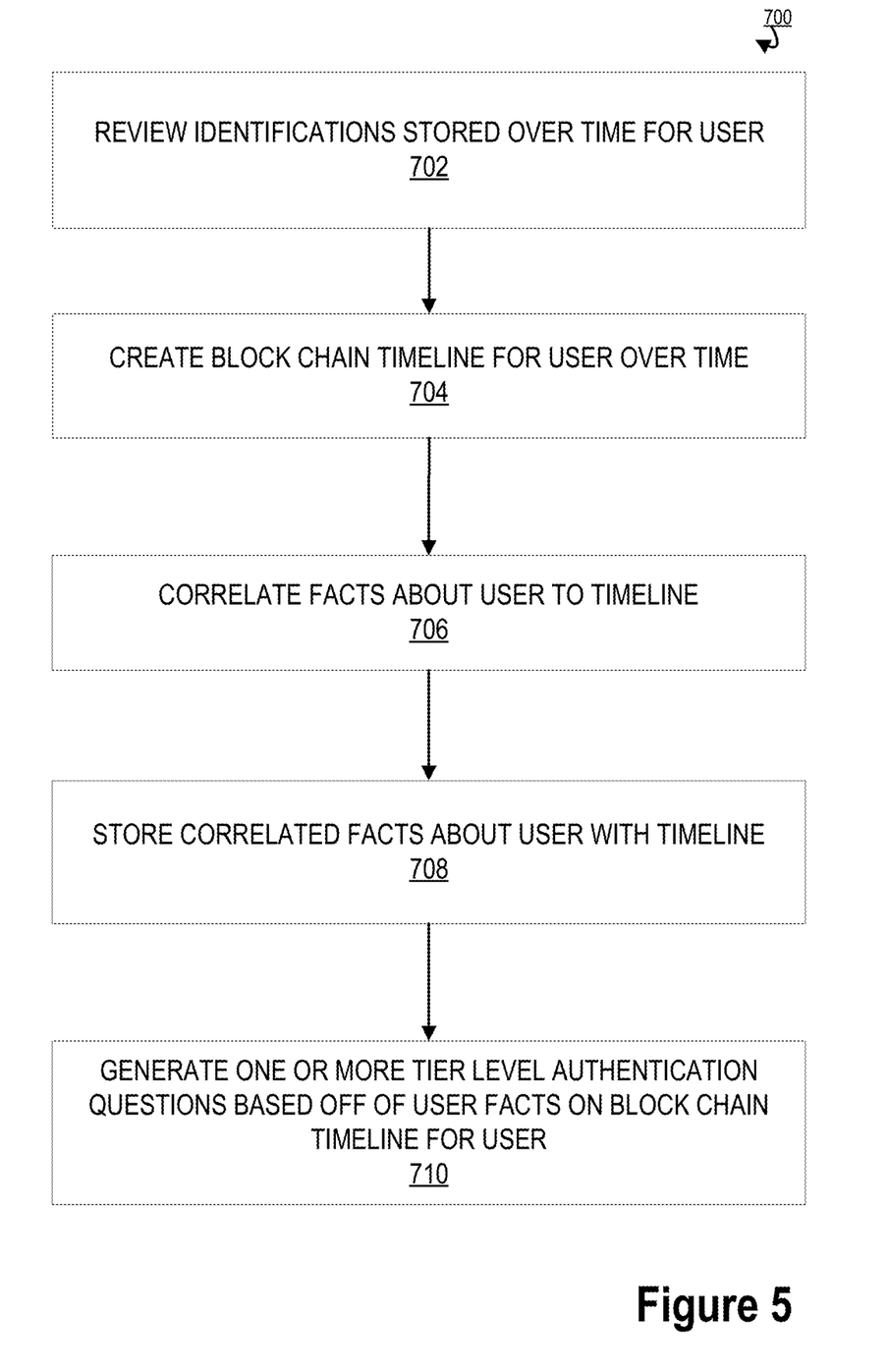
FIG. 5 provides a process map illustrating the authentication question generation using the identification timeline, in accordance with one embodiment of the present invention.

FIG. 5 illustrates a process map for the authentication question generation using the identification timeline 700, in accordance with one embodiment of the present invention. As illustrated in block 702, the process 700 continues by reviewing the identifications stored over time for the user. The review process identifies a user associated with each identification and confirms that the identification is associated with the user. Subsequently, the system may correlate future identifications with the initial user identification for compiling a timeline of user identifications.

As illustrated in block 704, the system may create the block chain timeline for the user over time. The created block chain timeline may be stored in the distributed ledger of the block chain database. As illustrated in block 706, the process 700 continues by correlating facts about the user to the timeline. The timeline is generated starting with the initial identification and being built in blocks of changed or morphed user identifications over time. These identifications may be stored together in correlation with the initial identification and illustrate a holistic view of a user identification and the changes of that identification, whether physical, location, signature, or the like, over a time period of the user's lifetime. Furthermore, the timeline may access third party servers in order to fill the timeline with facts about the user's life in correlation with the identification. The third party servers may include entity servers, financial institution servers, or the like. The user life facts may include events in the user's life identified by the identification changes, third party servers, or the like. These events may include geographic moves, location changes, vehicle purchases, house purchases, having a child, child life events, graduating school, or the like. As such, the distributed ledger may have a timeline of morphed identification of the user as well as facts that are correlated with the identifications for a view of the user.

Once the user life facts have been correlated to the user identification, the system may store the correlated user life facts with the identification timeline, as illustrated in block 708. In this way, the distributed ledger may store both the user identification information and user life facts.

Finally, as illustrated in block 710, the process 700 continues by generating one or more tier level authentication questions based off of the user facts on the block chain timeline for the user. The authentication questions may be generated by the system and be based on the morphed identification and/or the user facts. As such, the system may generate a photo of old signatures for user selection of a signature that the user has used in the past. Other questions may include information about when the user lived in various locations, physical attributes at various times associated with the user. In this way, the system may generate authentication questions that only the user may be able to determine.

Furthermore, the questions may be tier leveled such that the system may generate more challenging questions for the higher security level required. As such, the system ensures a security level for the user prior to accessing the entity systems.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 6823US1.014033.2555 | 14/942,326 | TRANSPARENT SELF-MANAGING REWARDS PROGRAM USING BLOCKCHAIN AND SMART CONTRACTS | Nov. 16, 2015 |
| 6908US1.014033.2652 | 15/041,555 | BLOCK CHAIN ALIAS FOR PERSON-TO-PERSON PAYMENTS | Feb. 11, 2016 |
| 6908USP1.014033.2556 | 62/253,935 | BLOCK CHAIN ALIAS PERSON-TO-PERSON PAYMENT | Nov. 11, 2015 |
| 6985US1.014033.2605 | 15/041,566 | BLOCK CHAIN ALIAS PERSON-TO-PERSON PAYMENTS | Feb. 11, 2016 |
| 6988US1.014033.2607 | 15/050,375 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 6989US1.014033.2608 | 15/050,379 | SYSTEM FOR EXTERNAL SECURE ACCESS TO PROCESS DATA NETWORK | Concurrently Herewith |
| 6990US1.014033.2609 | 15/050,358 | SYSTEM FOR PROVIDING LEVELS OF SECURITY ACCESS TO A PROCESS DATA NETWORK | Concurrently Herewith |
| 6991USP1.014033.2610 | 62/293,585 | SYSTEM FOR SECURE ROUTING OF DATA TO VARIOUS NETWORKS FROM A PROCESS DATA NETWORK | Feb. 10, 2016 |
| 6992USP1.014033.2611 | 62/293,620 | SYSTEM FOR CENTRALIZED CONTROL OF SECURE ACCESS TO PROCESS DATA NETWORK | Feb. 10, 2016 |
| 6993US1.014033.2612 | 15/049,605 | SYSTEM FOR CONTROL OF SECURE ACCESS AND COMMUNICATION WITH DIFFERENT PROCESS DATA NETWORKS WITH SEPARATE SECURITY FEATURES | Concurrently Herewith |
| 6994US1.014033.2613 | 15/049,716 | SYSTEM FOR CONTROL OF DEVICE IDENTITY AND USAGE IN A PROCESS DATA NETWORK | Concurrently Herewith |

-continued

| Docket Number | U.S. patent application Ser. No. | Title | Filed On |
|---|---|---|---|
| 6996US1.014033.2615 | 15/049,777 | SYSTEM FOR ESTABLISHING SECURE ACCESS FOR USERS IN A PROCESS DATA NETWORK | Concurrently Herewith |
| 6997US1.014033.2616 | 15/049,835 | SYSTEM FOR ALLOWING EXTERNAL VALIDATION OF DATA IN A PROCESS DATA NETWORK | Concurrently Herewith |
| 6998US1.014033.2719 | 15/050,094 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 6998USP1.014033.2617 | 62/287,293 | SYSTEM FOR CONVERSION OF AN INSTRUMENT FROM A NON-SECURED INSTRUMENT TO A SECURED INSTRUMENT IN A PROCESS DATA NETWORK | Jan. 26, 2016 |
| 6999US1.014033.2720 | 15/050,098 | SYSTEM FOR TRACKING AND VALIDATION OF MULTIPLE INSTANCES OF AN ENTITY IN A PROCESS DATA NETWORK | Concurrently Herewith |
| 6999USP1.014033.2618 | 62/287,301 | SYSTEM FOR TRACKING AND VALIDATION OF MULTIPLE INSTANCES OF AN ENTITY IN A PROCESS DATA NETWORK | Jan. 26, 2016 |
| 7000USP1.014033.2619 | 62/287,298 | SYSTEM FOR TRACKING AND VALIDATION OF AN ENTITY IN A PROCESS DATA NETWORK | Jan. 26, 2016 |
| 7001US1.014033.2620 | 15/050,372 | SYSTEM FOR ROUTING OF PROCESS AUTHORIZATIONS AND SETTLEMENT TO A USER IN A PROCESS DATA NETWORK | Concurrently Herewith |
| 7002US1.014033.2621 | 15/050,285 | SYSTEM FOR ROUTING OF PROCESS AUTHORIZATION AND SETTLEMENT TO A USER IN PROCESS DATA NETWORK BASED ON SPECIFIED PARAMETERS | Concurrently Herewith |
| 7003US1.014033.2622 | 15/050,292 | SYSTEM FOR GRANT OF USER ACCESS AND DATA USAGE IN A PROCESS DATA NETWORK | Concurrently Herewith |
| 7033US1.014033.2638 | 15/050,294 | SYSTEM FOR IMPLEMENTING A DISTRIBUTED LEDGER ACROSS MULTIPLE NETWORK NODES | Concurrently Herewith |
| 7038US1.014033.2643 | 15/049,865 | SYSTEM FOR EXTERNAL VALIDATION OF PRIVATE-TO-PUBLIC TRANSITION PROTOCOLS | Concurrently Herewith |
| 7039US1.014033.2644 | 15/049,852 | SYSTEM FOR EXTERNAL VALIDATION OF DISTRIBUTED RESOURCE STATUS | Concurrently Herewith |

-continued

| Docket Number | U.S. patent application Ser. No. | Title | Filed On |
|---|---|---|---|
| 7040US1.014033.2645 | 15/050,316 | SYSTEM FOR TRACKING TRANSFER OF RESOURCES IN A PROCESS DATA NETWORK | Concurrently Herewith |
| 7041US1.014033.2651 | 15/050,321 | SYSTEM FOR MANAGING SERIALIZABILITY OF RESOURCE TRANSFERS IN A PROCESS DATA NETWORK | Concurrently Herewith |
| 7042US1.014033.2640 | 15/050,307 | SYSTEM TO ENABLE CONTACTLESS ACCESS TO A TRANSACTION TERMINAL USING A PROCESS DATA NETWORK | Concurrently Herewith |

What is claimed is:

1. A system for tracking and validating instances of a user, the system comprising:
a memory device with computer-readable program code stored thereon;
a communication device;
a processing device operatively coupled to the memory device and the communication device, wherein the processing device is configured to execute the computer-readable program code to:
receive an initial identification for the user at one or more nodes of the block chain distributed network;
update a distributed ledger with the initial identification via transmission of data from the one or more nodes to the distributed ledger associated with the block chain distributed network;
receive one or more subsequent identifications for the user at the one or more nodes of the block chain distributed network, wherein the received one or more identifications identify morphs in the user identification over a time period;
confirm, via communication with third party systems, the received one or more subsequent identifications are associated with the user;
link the one or more subsequent identifications for the user to the initial identification to generate a timeline illustrating morphing of user identification over time, wherein the timeline illustrates changes in user identification including changes in signatures, physical attributes of the user, and geographic relocations of the user;
correlate user facts received from the one or more nodes of the block chain distributed network and third party systems to the timeline, wherein user facts include a signature the user has previously used, locations where and when the user lived, and physical attributes of the user at various previous times;
generate one or more authentication questions based on the user facts and timeline; and
present the generated one or more authentication questions to the user via a user device for user access into third party secure locations.

2. The system of claim 1, further comprising receiving a positive response to the presented one or more authentication questions from the user, wherein receiving the positive response to the presented one or more authentication questions further comprises allowing access into the third party secure location without additional third party authentication requirements.

3. The system of claim 1, wherein generating the one or more authentication questions based on the user facts and timeline further comprises generating a tier level authentication question based on authentication strength requirements for accessing the third party secure location.

4. The system of claim 1, wherein the initial identification and the one or more subsequent identifications comprises a government issued identification.

5. The system of claim 1, further comprising allowing access to the timeline for one or more entities based on a provided assessment from the one or more entities.

6. The system of claim 1, wherein the one or more nodes of the block chain distributed network is integrated into a third party system and coded to identify and transmit to the distributed ledger the initial identification and the subsequent identifications for the user.

7. A computer program product for tracking and validating instances of a user, the computer program product comprising at least one non-transitory computer-readable medium comprising code portions comprising:
an executable portion configured for receiving an initial identification for the user at one or more nodes of the block chain distributed network;
an executable portion configured for updating a distributed ledger with the initial identification via transmission of data from the one or more nodes to the distributed ledger associated with the block chain distributed network;
an executable portion configured for receiving one or more subsequent identifications for the user at the one or more nodes of the block chain distributed network, wherein the received one or more identifications identify morphs in the user identification over a time period;
an executable portion configured for confirming, via communication with third party systems, the received one or more subsequent identifications are associated with the user;
an executable portion configured for linking the one or more subsequent identifications for the user to the initial identification to generate a timeline illustrating morphing of user identification over time, wherein the timeline illustrates changes in user identification including changes in signatures, physical attributes of the user, and geographic relocations of the user;

an executable portion configured for correlating user facts received from the one or more nodes of the block chain distributed network and third party systems to the timeline, wherein user facts include a signature the user has previously used, locations where and when the user lived, and physical attributes of the user at various previous times;

an executable portion configured for generating one or more authentication questions based on the user facts and timeline; and an executable portion configured for presenting the generated one or more authentication questions to the user via a user device for user access into third party secure locations.

8. The computer program product of claim 7, further comprising an executable portion configured for receiving a positive response to the presented one or more authentication questions from the user, wherein receiving the positive response to the presented one or more authentication questions further comprises allowing access into the third party secure location without additional third party authentication requirements.

9. The computer program product of claim 7, wherein generating the one or more authentication questions based on the user facts and timeline further comprises generating a tier level authentication question based on authentication strength requirements for accessing the third party secure location.

10. The computer program product of claim 7, wherein the initial identification and the one or more subsequent identifications comprises a government issued identification.

11. The computer program product of claim 7, further comprising an executable portion configured for allowing access to the timeline for one or more entities based on a provided assessment from the one or more entities.

12. The computer program product of claim 7, wherein the one or more nodes of the block chain distributed network is integrated into a third party system and coded to identify and transmit to the distributed ledger the initial identification and the subsequent identifications for the user.

13. A computer-implemented method for tracking and validating instances of a user, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving an initial identification for the user at one or more nodes of the block chain distributed network;

updating a distributed ledger with the initial identification via transmission of data from the one or more nodes to the distributed ledger associated with the block chain distributed network;

receiving one or more subsequent identifications for the user at the one or more nodes of the block chain distributed network, wherein the received one or more identifications identify morphs in the user identification over a time period;

confirming, via communication with third party systems, the received one or more subsequent identifications are associated with the user;

linking the one or more subsequent identifications for the user to the initial identification to generate a timeline illustrating morphing of user identification over time, wherein the timeline illustrates changes in user identification including changes in signatures, physical attributes of the user, and geographic relocations of the user;

correlating user facts received from the one or more nodes of the block chain distributed network and third party systems to the timeline, wherein user facts include a signature the user has previously used, locations where and when the user lived, and physical attributes of the user at various previous times;

generating one or more authentication questions based on the user facts and timeline; and presenting the generated one or more authentication questions to the user via a user device for user access into third party secure locations.

14. The computer-implemented method of claim 13, further comprising receiving a positive response to the presented one or more authentication questions from the user, wherein receiving the positive response to the presented one or more authentication questions further comprises allowing access into the third party secure location without additional third party authentication requirements.

15. The computer-implemented method of claim 13, wherein generating the one or more authentication questions based on the user facts and timeline further comprises generating a tier level authentication question based on authentication strength requirements for accessing the third party secure location.

16. The computer-implemented method of claim 13, further comprising allowing access to the timeline for one or more entities based on a provided assessment from the one or more entities.

17. The computer-implemented method of claim 13, wherein the one or more nodes of the block chain distributed network is integrated into a third party system and coded to identify and transmit to the distributed ledger the initial identification and the subsequent identifications for the user.

* * * * *